US008181041B2

(12) United States Patent
Kung et al.

(10) Patent No.: US 8,181,041 B2
(45) Date of Patent: May 15, 2012

(54) WAVE-MODULATED SWITCHING FREQUENCY VOLTAGE REGULATOR

(75) Inventors: Chua Han Kung, Kedah (MY); Lian Wei Huan, Penang (MY)

(73) Assignee: Intel Corporation, Santa Clara, CA (US)

( * ) Notice: Subject to any disclaimer, the term of this patent is extended or adjusted under 35 U.S.C. 154(b) by 778 days.

(21) Appl. No.: 11/646,056

(22) Filed: Dec. 27, 2006

(65) Prior Publication Data

US 2008/0162963 A1  Jul. 3, 2008

(51) Int. Cl.
*G06F 1/26* (2006.01)
(52) U.S. Cl. .......................... 713/300; 323/272; 363/41
(58) Field of Classification Search .................. 713/340, 713/300; 323/272; 363/41
See application file for complete search history.

(56) References Cited

U.S. PATENT DOCUMENTS

| | | | | |
|---|---|---|---|---|
| 6,137,274 | A | * | 10/2000 | Rajagopalan ................ 323/272 |
| 6,262,566 | B1 | * | 7/2001 | Dinh ............................ 323/282 |
| 6,366,067 | B1 | * | 4/2002 | Zhang et al. ................. 323/282 |
| 7,808,125 | B1 | * | 10/2010 | Sachdeva et al. ............. 307/82 |
| 2005/0194948 | A1 | * | 9/2005 | Carlson et al. ............... 323/272 |
| 2007/0290664 | A1 | * | 12/2007 | Moyer et al. ................. 323/272 |
| 2008/0224678 | A1 | * | 9/2008 | Tobin et al. .................. 323/283 |

OTHER PUBLICATIONS

"Power delivery for high-performance microprocessors", Electronic Package Technology Development, Intel Technology Journal, vol. 9, issue 4, Nov. 9, 2005.

Edward Stanford, "New processors will require new powering technologies", TDI Power System Solutions, Power Electronics Technology, pp. 1-7, Feb. 1, 2002.
Michael T. Zhang, "Powering Intel Pentium 4 generation processors", Platform Technology Operations, Intel Corp., OR USA, pp. 215-218, IEEE 2001.
U.S. Appl. No. 10/750,585, filed Jul. 7, 2005.
U.S. Appl. No. 11/152,280, filed Jun. 14, 2005.
U.S. Appl. No. 11/434,423, filed May 12, 2005.
U.S. Appl. No. 11/432,868, filed May 12, 2005.
U.S. Appl. No. 11/434,308, filed May 12, 2005.

* cited by examiner

*Primary Examiner* — Albert Wang
(74) *Attorney, Agent, or Firm* — Blakely, Sokoloff, Taylor & Zafman LLP

(57) ABSTRACT

A method and apparatus for a wave-modulated switching frequency voltage regulator VR are described. In one embodiment, a controller dynamically adjusts a phase switching frequency of the VR to render the VR immune from synchronization between an IC load frequency and the VR phase switching frequency. In one embodiment, the method includes generation of a dynamic switching frequency waveform according to a wave modulated reference voltage. The dynamic switching frequency waveform may comprise a plurality of pulses with a modulated frequency. At least two, time-shifted pulse width modulated (PWM) waveforms may be fired to corresponding drivers of a multi-phase switching VR in response to such dynamic switching waveform. In one embodiment, PWM waveforms are fired to the drivers of the regulator in response to a frequency of the pulses of the dynamic switching frequency waveform to provide continuous adjustment of the VR switching frequency. Other embodiments are described and claimed.

20 Claims, 10 Drawing Sheets

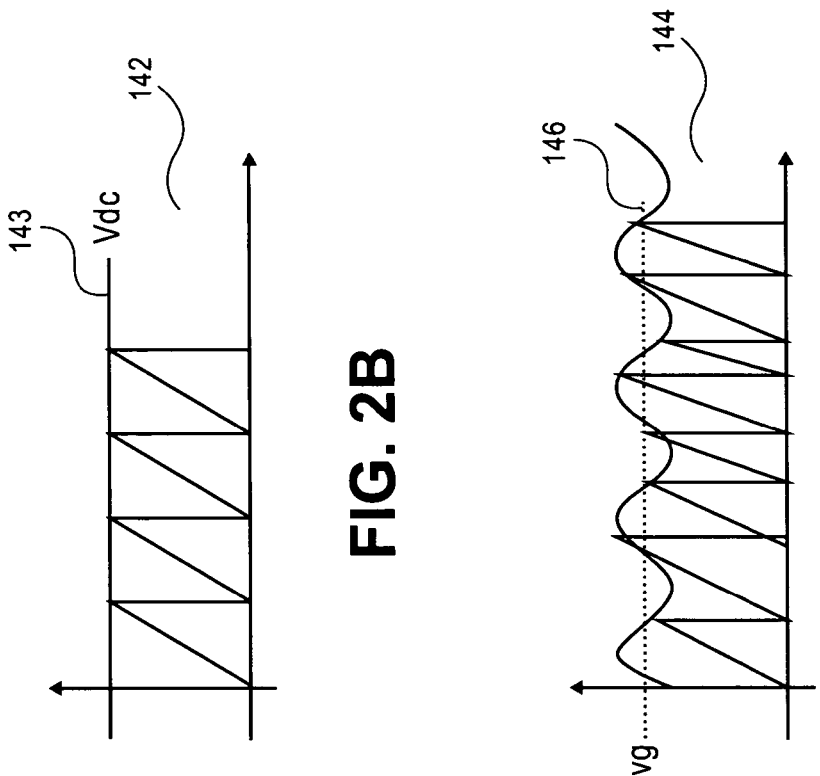
FIG. 2B
FIG. 2C
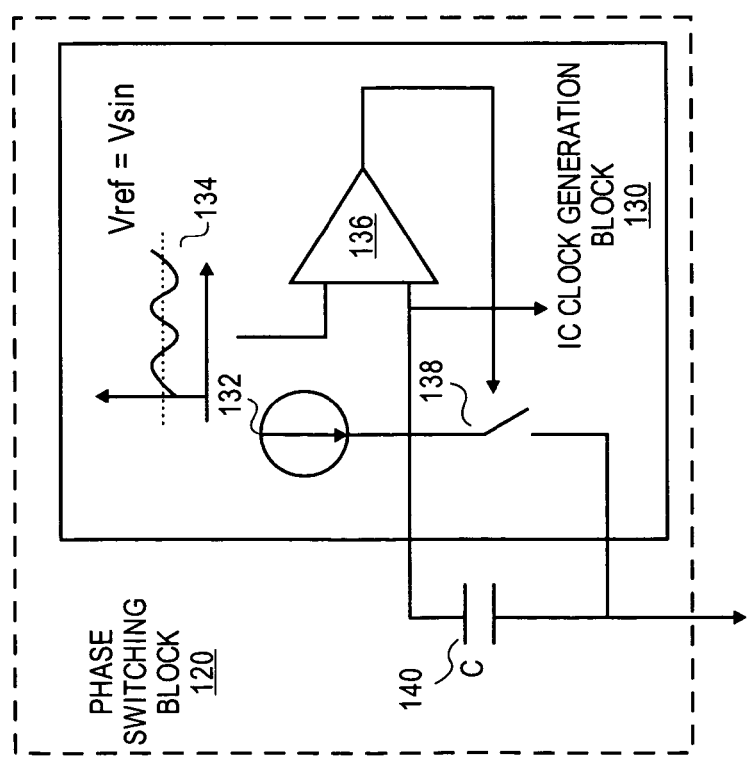
FIG. 2A

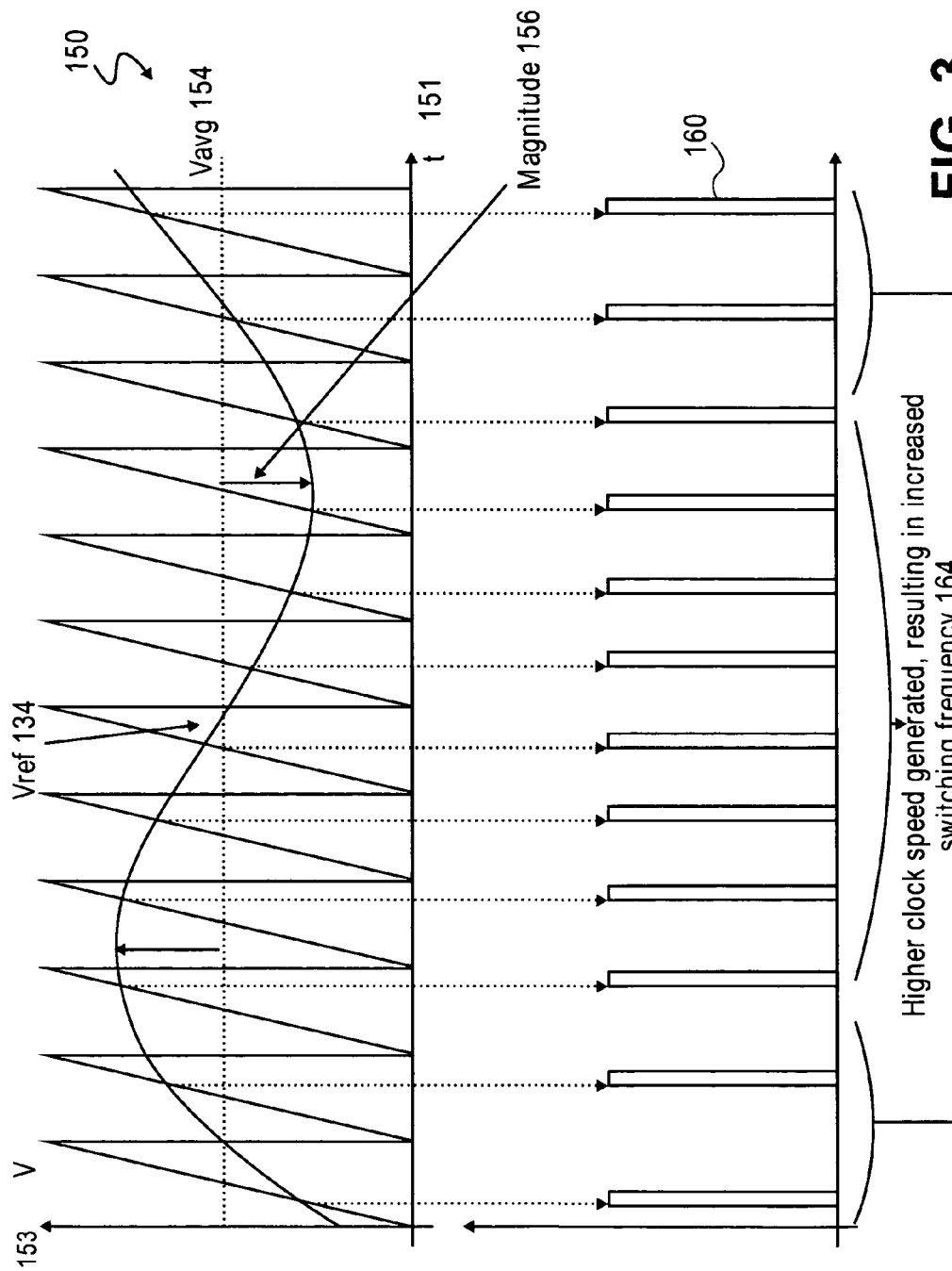

WAVE-MODULATED SWITCHING FREQUENCY VOLTAGE REGULATOR

FIELD

One or more embodiments relate generally to the field of integrated circuit and computer system design. More particularly, one or more of the embodiments relate to a method and apparatus for a wave-modulated dynamic switching frequency voltage regulator.

BACKGROUND

Over the last several decades, significant advancements in personal computer (PC) microprocessor architecture and fabrication techniques provide improved performance, while controlling costs. With each successive generation, an increasing number of functions are integrated into a processor integrated circuit die. This increase in density is enabled by shrinking the size of the constituent transistor elements to allow more transistors per unit area on the die. Performance improvements are obtained by, for example, increasing the clock frequency at which certain functions of the processor operate. As a result, each successive generation of such processors is more powerful from a total performance standpoint, while increasing overall power consumption.

The power consumption of a processor is proportional to a product of its power supply voltage and current. Successive generations of processors with increasing transistor density operating at higher speeds (e.g., higher clock frequency) demand a lower power supply voltage but higher power supply current. For example, in the early days of microprocessors offered by Intel Corp. of Santa Clara, Calif., transistor count per die was in the low 100,000s, processor clocks were running at around 100 MHz, supply voltages were at 5V DC, and supply current was no more than 10A (depending on the activity level of the processor). With more recent Pentium class processors, transistor count per die is well above 1 million, clocks are in the GHz range, the power supply voltage is dropped to about 1.2V DC or less, while current draw (at high activity levels) easily surpasses 100A.

The supply voltage is regulated to stay within a certain range in the presence of operating temperature variations and as the processor transitions between different activity levels. However, the smaller supply voltages results in tighter ranges requirement, in the face of large current swings. This results in many challenges to providing low cost power delivery for advanced processors.

To ensure reliable power delivery for its microprocessor families, Intel has set voltage regulator design guidelines. A voltage regulator (VR) is an electronic circuit that draws current from a power source to feed the processor and maintain a well-regulated power supply voltage for the processor. The VR maintains a set-point voltage (e.g., at a so-called "Vcc" node of the processor,) using a feedback control loop that repeatedly senses deviations from the set-point, and corrects for them by increasing or decreasing the amount of current drawn from the source. For greater power conversion efficiency, switching-type regulators are used that draw current from the source using transistor or similar devices that turn on and off at high rates and stay on for relatively short pulses. The set-point voltage is maintained by suitably controlling the pulse widths or duty cycle.

Conventional switching VRs for high performance processors have more than two phases or paths to the power source, through which current is drawn to maintain the supply voltage. The multiple phases help reduce the magnitude of voltage and current ripple, which enables the use of smaller phase inductors and power transistor switches, as well as smaller filtering and decoupling components at the output of the VR. In addition, a multi-phase switching VR can respond quickly to deviations from the set-point voltage (both voltage droops and voltage spikes) to help maintain the smaller supply voltages within tighter tolerance bands.

Conventional multi-phase VRs have a fixed phase-switch frequency. The phases are all fired at the same frequency, but time shifted relative to each other. For example, a 100 kHz two-phase regulator will have both phases switching at 100 kHz, with the assertion edges of the two phases separated by five microseconds (one-half the switching period). This approach, however, is problematic when the load current to the VR (for example, the power supply current to a processor) is in essence synchronized to the switching frequency. For instance, a periodic load of five microseconds high current, five microseconds low current creates a serious current imbalance in the two-phase 100 kHz VR. If left unchecked, the current imbalance may quickly reach the per-phase current-limit and usually lead to some form of automatic shutdown of the VR, which may cause the CPU to shutdown unexpectedly, leading to system problems. Some VR implementations do not have a per phase over-current limit/protection. As a result, such VR implementation are susceptible to catastrophic thermal failure (not recoverable) when on one phase as it takes all the current (current imbalance) meant to be shared among all the other phases.

There are conventional schemes to reduce the fatal current imbalance, where such schemes typically rely heavily on bulk capacitance at the output, to reduce the need for temporal alignment of current into the VR versus current out of the VR. In one case, a phase current is compared with an average current (that represents the average current amongst all of the phases), and the duty cycle is controlled on that basis to minimize the difference of current in each phase.

BRIEF DESCRIPTION OF THE DRAWINGS

The various embodiments of the present invention are illustrated by way of example, and not by way of limitation, in the figures of the accompanying drawings and in which:

FIG. 2A is a block diagram further illustrating the phase switching block shown in FIG. 1, in accordance with one embodiment.

FIGS. 2B and 2C are timing diagrams to illustrate generation of a wave-modulated clock pulse, according to one embodiment.

FIG. 3 is a timing diagram to further illustrate generation of a wave-modulated clock pulse to proving a dynamic phase switching, according to one embodiment.

DETAILED DESCRIPTION

A method and apparatus for a wave-modulated switching frequency voltage regulator (VR) are described. In one embodiment, an analog/digital controller is provided that dynamically adjusts a phase switching frequency of the VR to render the VR immune from synchronization between an integrated circuit (IC) load frequency and the VR phase switching frequency, which is referred to herein as "load frequency synchronization." As describer herein, the "load frequency synchronization" is a phenomenon that occurs when one phase of a multi-phase voltage regulator turns on for the entire cycle to support an IC device load. As a result, thermal and current imbalances may cause thermal runaway or possibly damage the integrated circuit, due to VR failure. In one embodiment, a method for operating a multi-phase switching regulator is described.

The method may include the generation of a dynamic switching frequency waveform according to a wave modulated reference voltage. The dynamic switching frequency waveform may comprise a plurality of pulses with a modulated frequency. Based on such dynamic switching waveform, at least two, time shifted pulse width modulated (PWM) waveforms may be fired to corresponding drivers of a multi-phase switching VR. In one embodiment, the time-shifted, PWM waveforms are fired to the drivers of the regulator in response to pulses of the dynamic switching frequency waveform to provide continuous adjustment of a switching frequency between the at least two phases of the VR to prohibit the load frequency synchronization.

In the following description, numerous specific details such as logic implementations, sizes and names of signals and buses, types and interrelationships of system components, and logic partitioning/integration choices are set forth to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

In the following description, certain terminology is used to describe features of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like.

Figure 1:
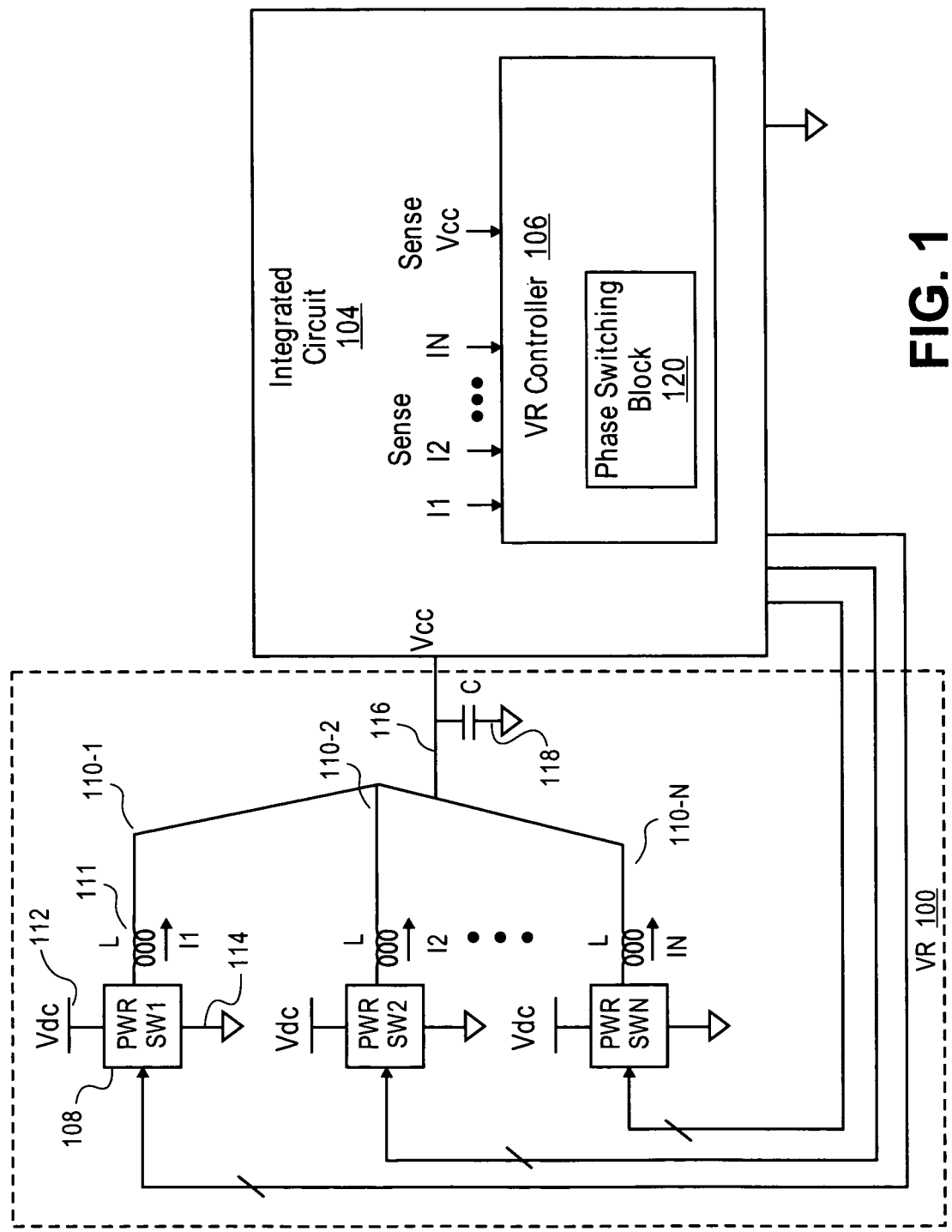
FIG. 1 is a schematic diagram of a wave-modulated, switching frequency voltage regulator that is coupled to power an integrated circuit device, in accordance with one embodiment.

FIG. 1 illustrates a schematic diagram of a wave-modulated, multi-phase switching VR 100 that is coupled to power an integrated circuit (IC) device 104, in accordance with an embodiment. Representatively, the relevant portions of VR 100 are shown, including two or more (N) phases 110 (110-1, ..., 110-N) that feed the same output node 116. A capacitor 118 on the output node 116 may represent any low pass filtering and/or decoupling capacitance that is needed. This includes not just bulk capacitance but also structures that are on-chip or in-package with the IC device 104. The output node 116, in this case, is also the input power supply node or "pin" of the IC device 104 (with voltage Vcc).

Each phase includes a solid state power switch 108 that connects a path of current into an inductor 110, from either a power supply node 112 (with voltage Vdc) or a power return node 114 (ground). In operation, the power switch 108 either drives phase current I1 from Vdc into the inductor 110 (in a particular direction), or allows the existing current I1 in the inductor 110 to recirculate through the power return node 114. These actions are controlled by one or more control signals that are provided by VR controller circuitry 106. The circuitry 106 implements closed loop control of Vcc at node 116, based on feedback information. The control signals to power switches 108 may be binary signals that are pulse width modulated using known feedback control compensation schemes to regulate Vcc at a given set-point voltage.

Although FIG. 1 shows VR circuitry 106 as being part of the integrated circuit device 104 (e.g., on-chip or in the same integrated circuit package as the device 104), an alternative is to provide the circuitry 106 as a separate package or device for use with different types of integrated circuit devices 104.

In one embodiment, VR controller 106 has a phase switching block 120 that controls a switching frequency between firing of the N phases 110 of VR 100. In one embodiment, the phase switching block 120 generates a dynamic switching frequency waveform for switching between a plurality of phases of VR 100. As further shown in FIG. 2A, in one embodiment, an oscillating reference voltage is used to vary a clock that is used by VR controller 106 to generate the switching frequency for each phase of VR 100, such that the switching frequency of each phase of VR 100 is continuously adjusted to prohibit the load frequency synchronization phenomenon by IC 104. In one embodiment, the rate at which switching frequency is adjusted can be determined based on an amplitude and frequency of an oscillating reference voltage. This technique allows the current imbalance, which typically occurs in a multi-phase VR in the presence of a synchronous load, to be reduced substantially, or even completely eliminated, without shutting down/interrupting the operation of the VR.

FIG. 2A is a block diagram further illustrating the phase switching block 120 shown in FIG. 1, in accordance with one embodiment. Representatively, phase switching block 120 includes IC clock generation block 130. In the embodiment illustrated, IC clock generation block 130 includes a current source 132, a switch 138, an external capacitor 139, a reference voltage 134 and a comparison block 136. In one embodiment, current source 132 is used to charge external capacitor 140, whose voltage would rise up to a reference voltage 134, at comparison block 136. In one embodiment, once reference voltage 134 is reached, comparison block 136 initiates switch 138 to discharge external capacitor 140 to return the voltage to a nominal level.

FIGS. 2B and 2C are clock diagrams to illustrate generation of a wave-modulated clock pulse, according to one embodiment. As shown in FIG. 2B, waveform 142 illustrates a saw tooth wave pattern having a ramp rising edge and a fast falling edge. As shown in FIG. 2B, the saw tooth waveform 142 provides a fixed signal based on a fixed reference voltage (Vdc) 143. Conversely, as shown in FIG. 2C, the saw tooth waveform is varied, such that the ramp rising edge rises until intersection with an edge of variable reference voltage (Vref) 134. Accordingly, as shown in FIGS. 2B and 2C, a charging time between the two waveforms is fixed due to the fixed capacitor, with a triggering level for comparison block 136 being different due to variable Vref voltage 134. In one embodiment, oscillating Vref voltage 134 enables comparison block 136 to dynamically change the time it takes to initiate a switch 138 to create a varying clock according to an average voltage (Vavg) 146, from which a dynamic switching frequency of VR 100 can be derived, for example, as shown in FIG. 3.

FIG. 3 is a timing diagram to further illustrate generation of a wave-modulated clock pulse, according to one embodiment. Representatively, FIG. 3 illustrates timing diagram FIG. 150, as well as clock pulse signal 160, according to one embodiment. Signal diagram 150 includes a timing axis (T) 151 and a voltage axis (V) 153. In addition, a saw tooth wave pattern 150 is provided with a ramp rising edge and a fast falling edge. As shown, reference voltage (Vref) 134 is provided according to an oscillating reference voltage such as, for example, a sine wave. Although wave modulated reference voltage (Vref) 134 is illustrated as a sine wave, the generation of the dynamic switching frequency is not limited to a sine wave, and can use other types of wave modulations, while remaining within the scope of the described embodiments and claims.

As illustrated in FIG. 3, clock pulse signal 160 is generated according to the rate at which the ramp rising edge of saw tooth waveform 150 intersects Vref signal 134. Accordingly, the rate (frequency) at which clock pulse 160 is generated depends on when the reference voltage 134 intersects a ramp rising edge of saw tooth waveform 150. Although a saw tooth waveform is provided to illustrate the described embodiment, other waveforms including triangular (dual edge) waveforms or other like-waveforms may be used in the generation of the wave modulated clock pulse signal 160. Representatively, without providing a fixed reference voltage, a clock generated to determine the switching frequency of VR 100 is varied around an average value (Vavg) 154 with a magnitude 156 that are used to determine the rate of change of the dynamic switching frequency.

In the embodiment illustrated, the generated pulses 162/164 of wave-modulated clock pulse 160 have a fixed width and only the rate at which the clock pulses 162/164 are generated is affected. Accordingly, the embodiment illustrates that portion 162 of clock pulse signal 160 has a lower frequency resulting in a reduced switching frequency of the VR phases. Conversely, a portion 164 of clock pulse waveform 160 has a higher clock speed which results in an increased switching frequency of the VR phases. Therefore, the frequency of pulses 162/164 of the clock pulse waveform 160 varies according to the rate at which the oscillating reference voltage intersects the ramp rising edge of the saw tooth waveform 150.

Although illustrated with reference to intersection with a saw tooth waveform, it should be recognized that there are numerous methods to generate a ramp (in addition to repetitively driving a current source to derive the voltage ramp) and the determined rate may not necessary require intersection. In one embodiment, a certain state may be achieved, for example, if the voltage/current/state reaches "x", then do "y" logic (analog to digital converters, etc.) create the oscillation and wave-modulated pulse. In one embodiment, phase switching block 120 (FIG. 1) creates the oscillation and wave-modulated pulse according the state. In one embodiment, changes to the switching frequency are gradual; a sudden change in either a fast or slower clock speed may be replaced with changes in an analog manner, and/or changes in a digital manner. Accordingly, in one embodiment, the oscillating reference voltage is used to vary the clock provided by controller 106 to generate the switching frequency for each phase of the multi-phase switching voltage regulator 100, for example, as shown in FIG. 1.

Figure 4:
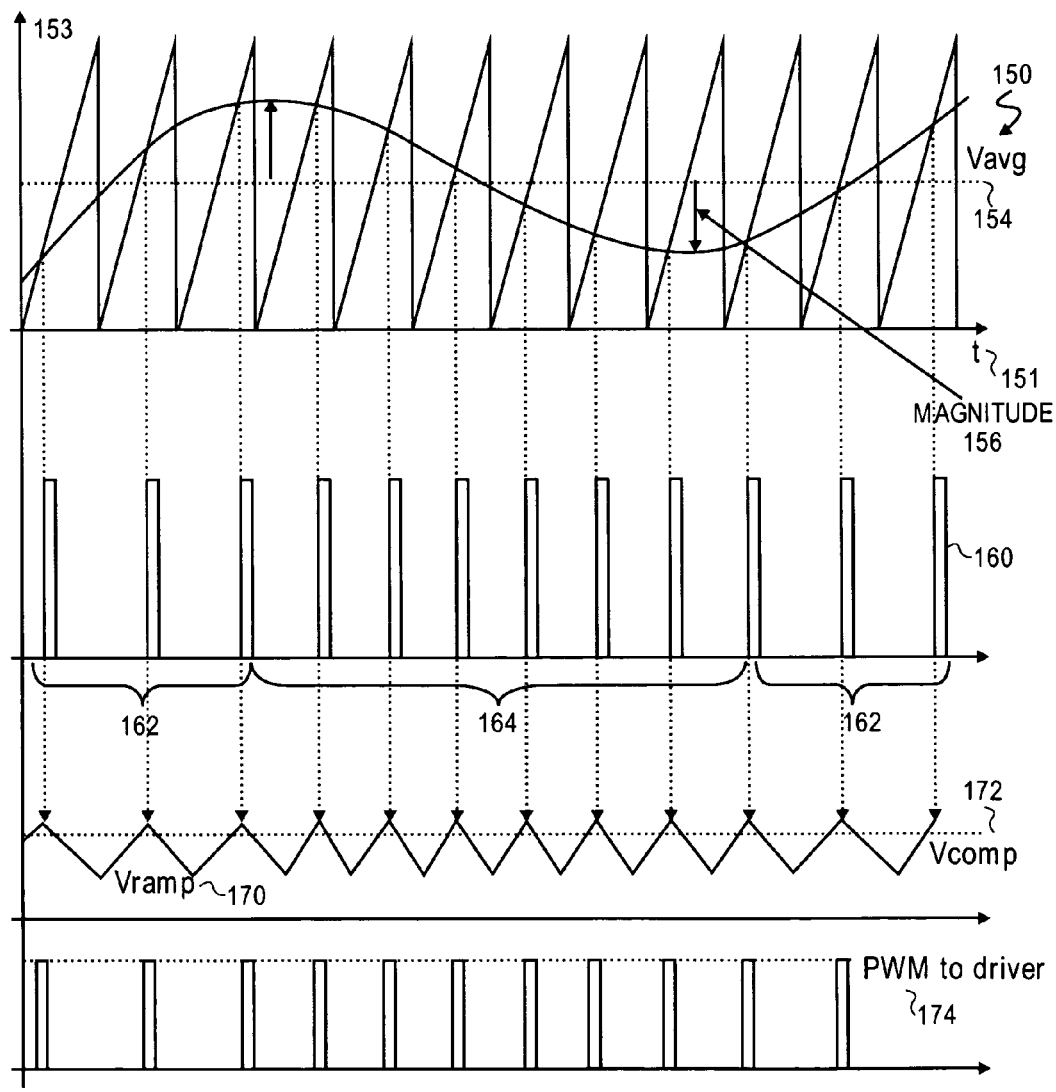
FIG. 4 is a timing diagram to illustrate generation of a wave-modulated multi-phase switching frequency pulse, according to one embodiment

FIG. 4 is a timing diagram to illustrate generation of a wave-modulated multi-phase switching frequency pulse, according to one embodiment. Representatively, FIG. 4 further illustrates saw tooth waveform 150, as shown in FIG. 3, as well as wave-modulated clock pulse signal 160. As further illustrated in FIG. 4, a voltage ramp (Vramp) 170, as well as a voltage comparable value (Vcomp) 172 are also described. As shown in FIG. 4, the rate of modulated clock pulse signal 160 is used to derive the Vramp 170 and then used to determine the transient/response of VR 100. This may be performed by using a control loop that provides a response to the fluctuating Vcomp signal 172 as the voltage regulator operates under different loading conditions. In the embodiment illustrated, each rate modulated clock pulse 162/164 of waveform 160 is used as the center of duty cycle ramp (Vramp) 170 to provide, for example, dual modulations of a leading edge/trailing edge to provide the required output voltage at output node 116 of the voltage regulator 100. (See FIG. 1.) Accordingly, as shown in FIG. 4, a dynamic switching frequency waveform 174 is provided which directs the firing of the PWM waveforms 240 to derive the output voltage of the VR.

Figure 5:
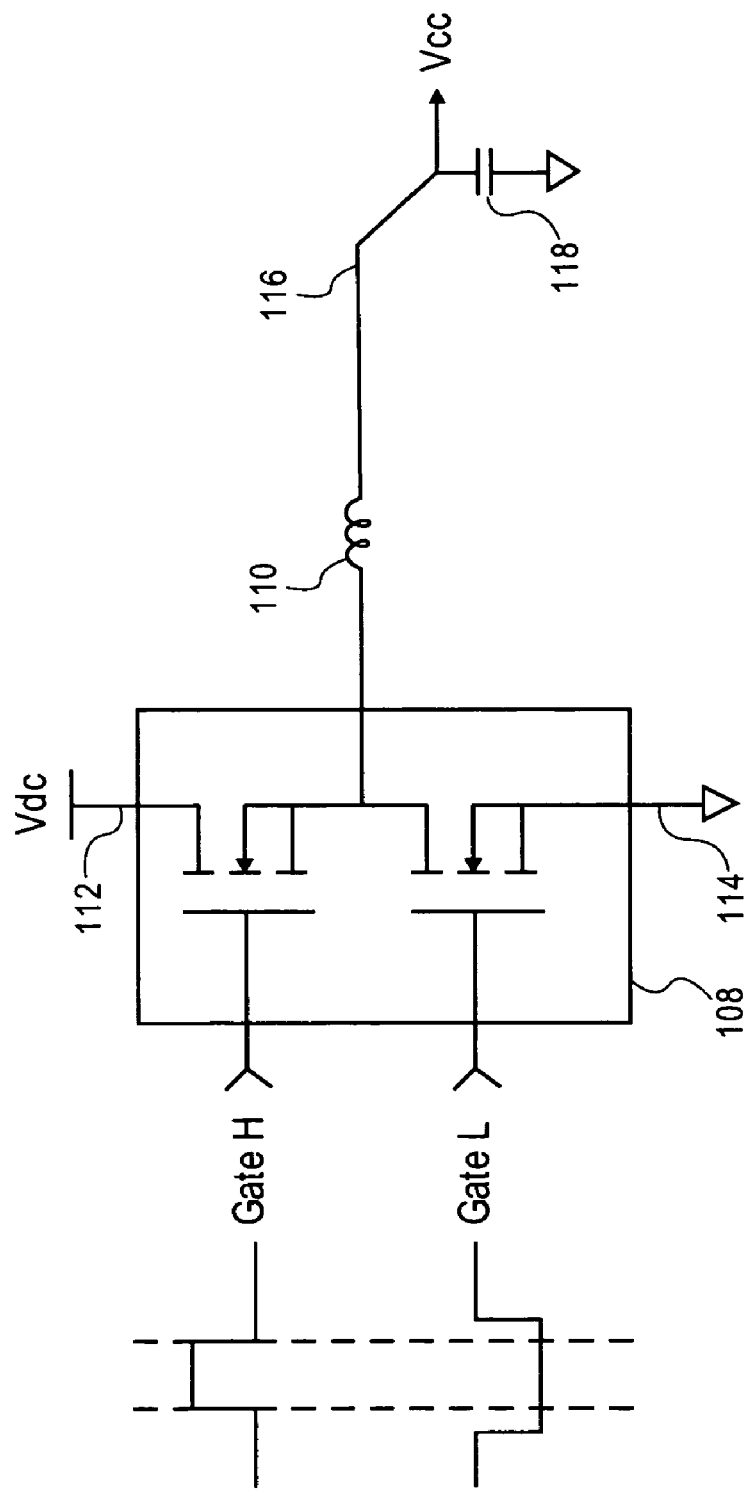
FIG. 5 is a circuit schematic of an example, single phase in a multi-phase switching voltage regulator, according to one embodiment.

FIG. 5 is a circuit schematic of an example, single phase in a multi-phase switching voltage regulator, according to one embodiment. In FIG. 5, a circuit schematic of an example single phase, of a multi phase VR, is shown. In this case, the power switch 108 includes a high side transistor that connects the inductor 110 to power supply node 112, and a low side transistor that connects the inductor 110 to power return node 114. The high side transistor is operated as a switch, and its on and off conditions are controlled by the gate H signal, whereas the low side transistor is controlled by a gate L signal.

In one embodiment, the transistors are driven in a manner inverse to each other, as indicated by the pulse-type waveforms and in accordance with a dynamic switching frequency. In this case, the phase is "fired" by pulsing the high side transistor and the low transistor, to drive a current into the inductor 110 from the power supply node 112. Note that for a multiphase VR, there will be 2 or more such phases feeding the common output node 116.

Figure 6:
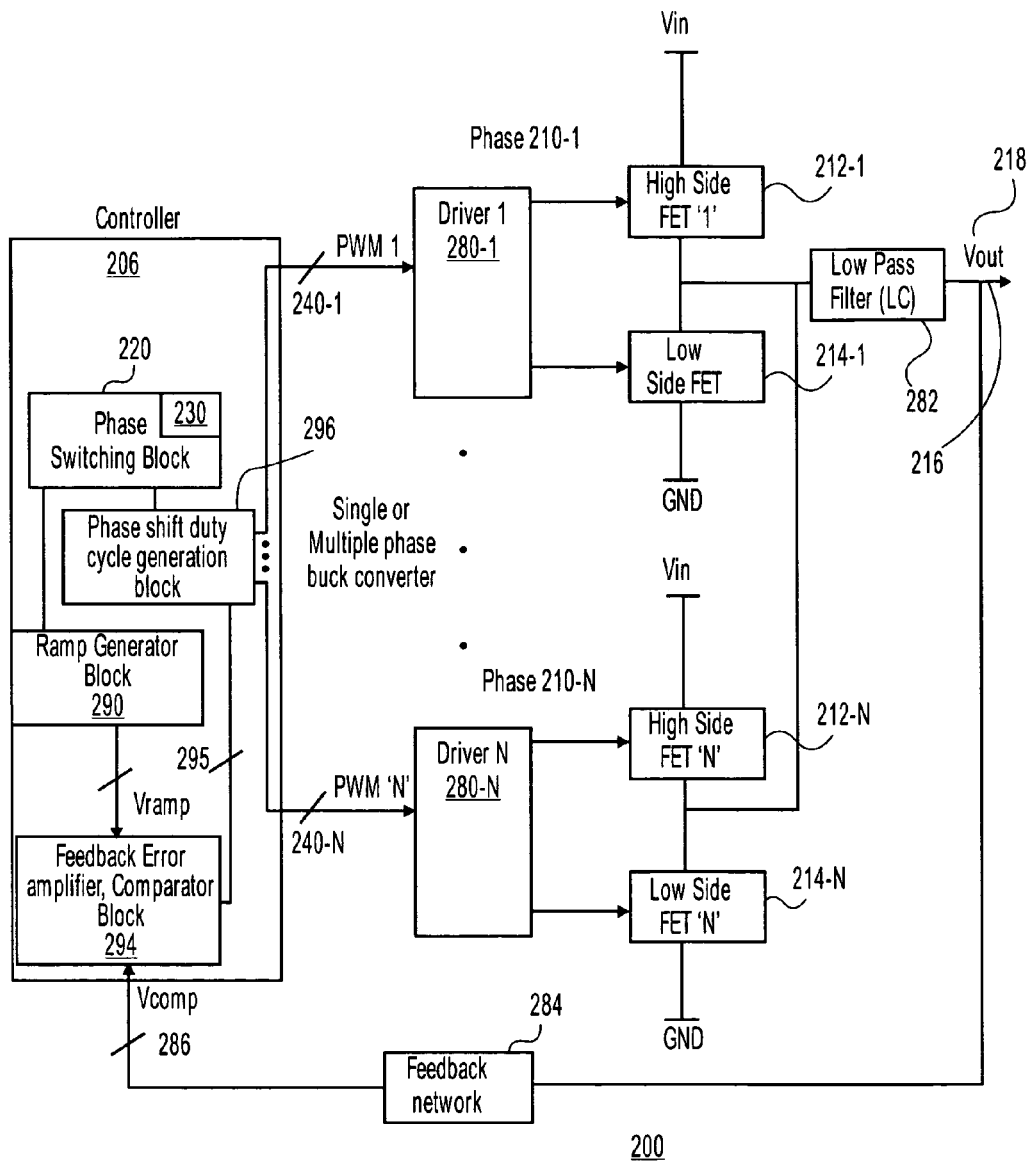
FIG. 6 is a circuit schematic of a multi-phase switching voltage regulator having a dynamic switching frequency, according to one embodiment.

FIG. 6 is a circuit schematic of a multi-phase switching 200 having a dynamic switching frequency, according to one embodiment. Representatively, VR 200, as shown in FIG. 6, includes phase switching block 220 to control ramp generation block 290, as well as phase shift/duty cycle generation block 296. In the embodiment illustrated, phase shift/duty cycle generation block 296 may generate pulse width modulated (PWM) waveforms 240 (240-1, . . . , 240-N) that are provided drivers 280 (280-1, . . . , 280-N.) In one embodiment, PWM waveforms 240 generated by controller 200 are used as an input to turn on/off both the high side switches 212 (212-1, . . . , 212-N) and the low side switches 214 (214-1, . . . , 214-N) through their gates to provide a required output voltage at output node 216.

In one embodiment, VR 200 may operate using leading edge modulation (LEM), trailing edge modulation (TEM), or dual edge modulation (DEM) as a pulse width modulated control signal. The VR controller 206 may be integrated on an IC die or provided as separate component.

The compensator 294 effectively compares the measured voltage value from feedback network 284 to a reference or target value and produces duty cycle value 295. The compensator 294 may be a complex microprocessor, a simple logic or application-specific circuit, an input-output hub or a group of such devices. The target voltage may reflect the power needs or anticipated power needs of the IC or portion of the IC for which the signal is generated. The target voltage may also incorporate other parameters such as temperature, anticipated power needs, calibration factors, timer inputs, and any of a variety of other parameters. Using these two inputs, the sensor generates a duty cycle value output 295 that indicates the amount of voltage that a device (not shown) requires.

The duty cycle value 295 is applied to block 296 to provide pulse width modulation waveforms 240. The duty cycle value may be used to indicate the required pulse width for the PWM signals 240 or the required change in the pulse width of block 296. The duty cycle value 295 may take a variety of different forms. In one embodiment, the duty cycle value is a number indicating the required pulse width to block 296 output and a new value is provided at regular intervals, with a frequency in the tens of megahertz. In another embodiment, the signal indicates a required change. The particular features, frequency and values of the signal may be adapted to suit any particular application.

The PWM waveform or waveforms 240 (there may be multiple waveforms, one per phase 210 (210-1, . . . , 210-N)) generated by controller 206 are received as an input by drivers 280 to control a frequency of turning on/off switching circuits 212/214 that then generate the output drive voltage 218 at common output node 216. The switching circuit 212/214 may apply the input to an amplifier, the output of which is coupled to a gate of a switch, such as a MOSFET (metal oxide semiconductor field effect transistor) switch. The source for the switch is coupled to an input voltage and the drain of the switch is coupled to the output 216 through an inductor. The leading edge of the PWM waveform 240 directs drivers 280 to turn on the switch and the trailing edge directs drivers 280 to turn off the switches for both the high side and the low side switches. The inductor and capacitor(s) even out the voltage transitions.

In one embodiment, the rate at which controller 206 directs phase shift/duty duty cycle generation block 296 to drive PWM waveforms 240 to drivers 280 is defined by the switching frequency of VR 200. As further illustrated in FIG. 6, low pass filter (LC) 282 is provided to filter the output provided by switches 212 and 214 to provide the stable output voltage 218 at output node 216 to drive, for example, an IC device.

In one embodiment, multi-phase switching VR 200 can be configured as a buck regulator. However, in contrast to conventional buck regulators, VR 200 is no longer susceptible to the load synchronization phenomenon described above. This phenomenon is particularly problematic due to the fact that the newer CPUs throttle their load more frequently and with varying amplitudes, thus increasing the probability that the CPU or IC load from a VR is synchronized with the switching frequency of the VR.

As indicated above, when the CPU load is in synchronized with a VR phase switching frequency, at an every instance the CPU load pulls current from the VR, such action causes the phase to open its duty cycle to its maximum (if a limiter exists.) Current balance is also poor due to phases sourcing and sinking current to maintain constant output current, which is the Achilles' heel of almost all buck regulators in the market. This could potentially cause the inductors and other switching components to see increased temperatures that could cause inductors saturation and/or thermal runaway of components. In practice, the load synchronization phenomenon may be cause a VR to fail within 30 seconds depending on the magnitude of the frequency.

Accordingly, in one embodiment, by providing a dynamic switching frequency, the switching frequency of VR 200 can dither or change constantly within a preset range (depending on the magnitude of the reference oscillation.) Accordingly, as an IC device load toggles to match the switching frequency of VR 200, since the VR switching frequency is constantly changing the synchronization is prohibited, thereby avoiding the load synchronization phenomenon.

Figure 7:
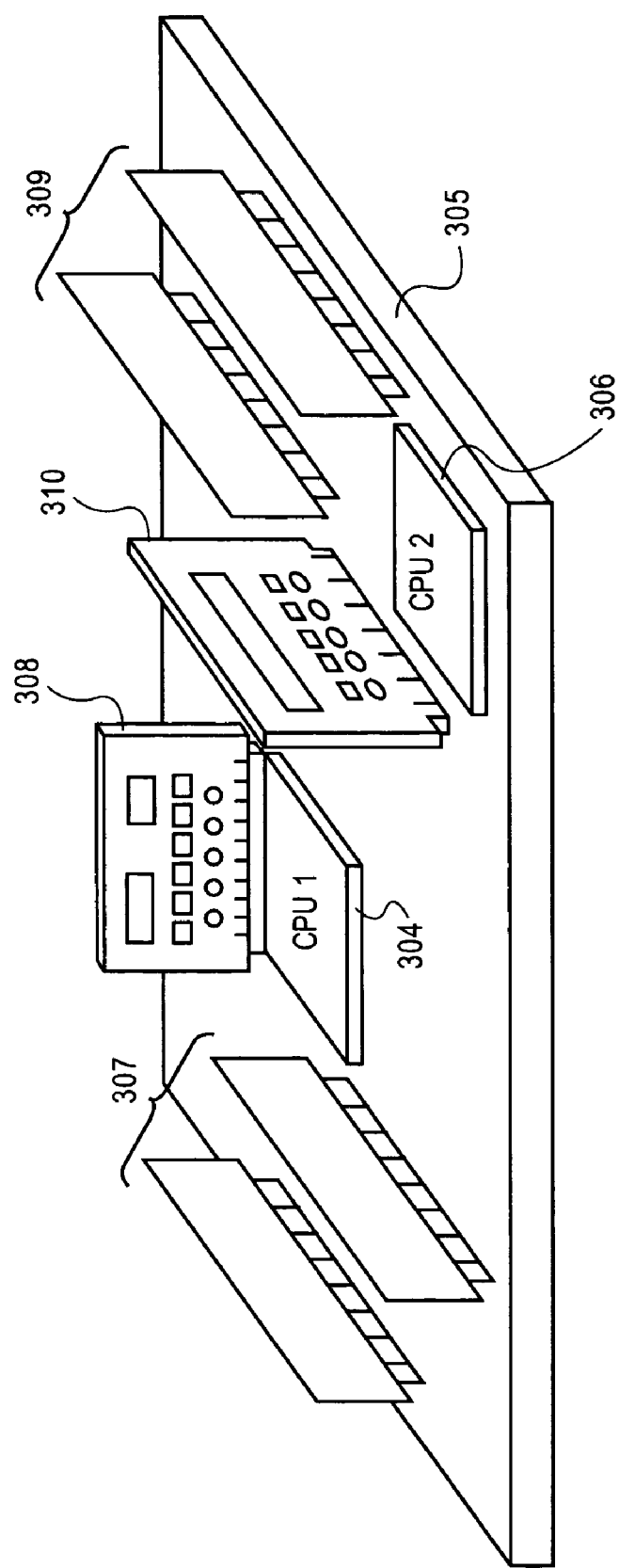
FIG. 7 is a conceptual perspective view of voltage regulator modules installed on a central processing unit (CPU) motherboard, according to one embodiment.
Figure 8:
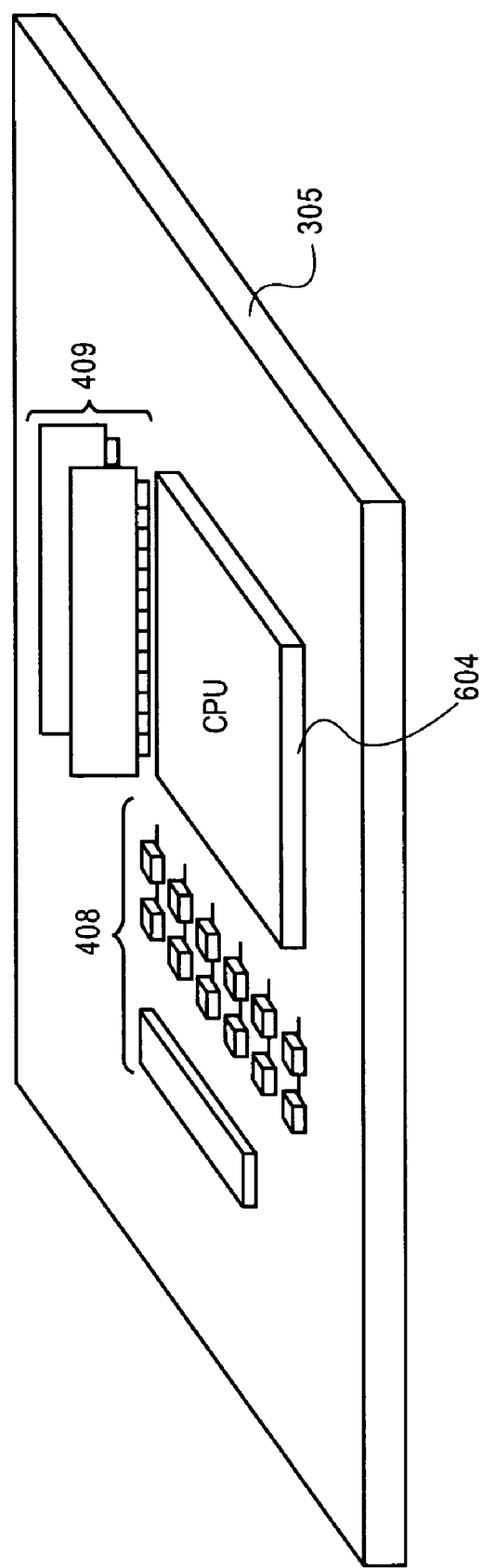
FIG. 8 is a conceptual perspective view of a motherboard with a CPU and its point of use voltage regulator directly installed on the board, according to one embodiment.

One or more embodiments described here are directed to a step-down, DC-DC multi-phase switching VR having a dynamic switching frequency to prohibit a current imbalance situation amongst the different phases due to the load synchronization phenomena. FIG. 7 and FIG. 8 show different system applications of the multi-phase VR. FIG. 7 is a conceptual perspective view of voltage regulator modules installed on a central processing unit (CPU) motherboard, according to one embodiment. In FIG. 7, a computer system is shown having a motherboard 305, which is a printed wiring board, on which are installed a pair of CPUs 304, 306 and their respective VR modules 308, 310. Each CPU is coupled to its respective main memory 507, 509 which is also installed on the motherboard 505. In one embodiment, main memory 307, 309 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

In one embodiment, each CPU may have one or more processor cores that draw their power supply current from a Vcc input "pin" of the CPU package (not shown). The circuitry that makes up VR 100, including the VR controller 106 and the phases shown in FIG. 1, are in this embodiment installed directly on the module 308, to power the CPU 304. Similarly, VR circuitry is installed directly on the other module 310, to power the CPU 306, such that each of the CPUs has its own separate VR module. This arrangement may be extended of course to more than 2 CPUs on the motherboard 305.

FIG. 8 is a conceptual perspective view of a motherboard with a CPU and its point of use voltage regulator directly installed on the board, according to one embodiment. Representatively, FIG. 8 shows an alternative arrangement for the motherboard 305, where a single CPU 404 is directly installed on the motherboard 405. In this case, the VR 408 is also directly installed on the motherboard 305, to power the CPU 404. The CPU 404 is also coupled to one or more memory modules 409 that are directly installed on the motherboard 405. This configuration is sometimes referred to as "voltage regulator—down." In yet another embodiment, the VR controller circuitry 106 (see FIG. 1) can be integrated on chip with its CPU.

Figure 9:
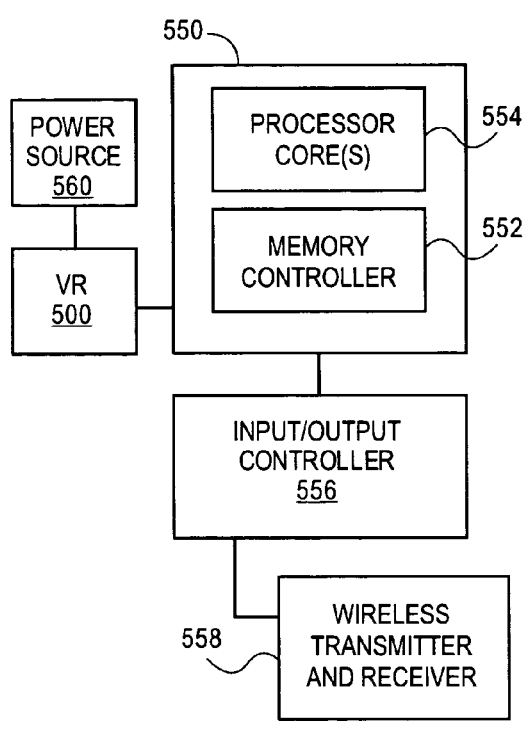
FIG. 9 is a block diagram illustrating a computer system according to any of the above described embodiments including a multi-core processor having an embedded memory controller according to one embodiment

FIG. 9 is a block diagram illustrating a computer system according to any of the above described embodiments including a multi-core processor having an embedded memory controller according to one embodiment. FIG. 9 illustrates a memory controller 552 is included in a chip 550, which also includes one or more processor cores 554. An input/output controller chip 556 is coupled to chip 550 and is also coupled to wireless transmitter and receiver circuitry 558.

Figure 10:
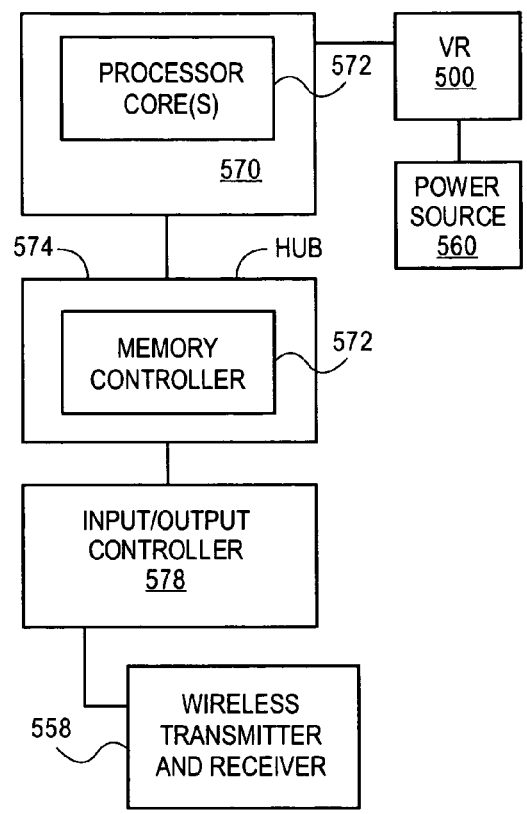
FIG. 10 is a block diagram illustrating a computer system according to any of the above described embodiments in which a memory controller is including in a hub chip according to one embodiment.

FIG. 10 is a block diagram illustrating a computer system according to any of the above described embodiments in which a memory controller is including in a hub chip according to one embodiment. In FIG. 10, memory controller 552 is included in a chip 574, which may be a hub chip. Chip 574 is coupled between a chip 570 (which includes one or more processor cores 572) and an input/output controller chip 578. Input/output controller chip 578 is coupled to wireless transmitter and receiver circuitry 558. In one embodiment, voltage regulator 500 (which represents any of the previously described wave-modulated switching frequency VRs) is coupled to power source (battery) 560 to provide power for operation the computer systems shown in FIGS. 9 and 10, while avoiding load synchronization.

Figure 11:
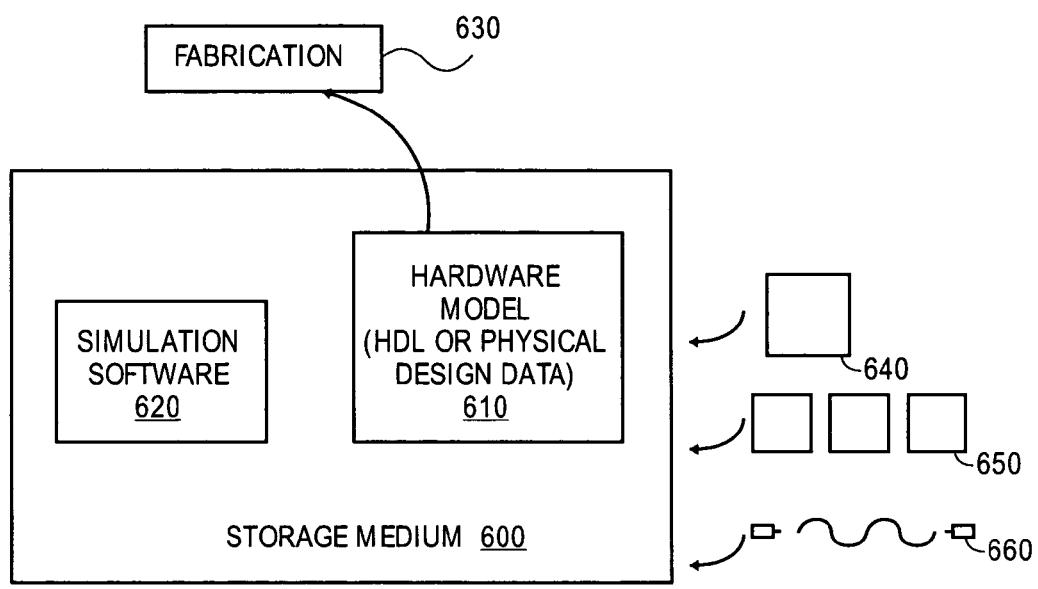
FIG. 11 is a block diagram illustrating various design representations or formats for simulation, emulation and fabrication of a design using the disclosed techniques.

FIG. 11 is a block diagram illustrating various representations or formats for simulation, emulation and fabrication 630 of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 610 may be stored in a storage medium 600, such as a computer memory, so that the model may be simulated using simulation software 620 that applies a particular test suite 530 to the hardware model to determine if it indeed functions as intended. In some embodiments, the simulation software is not recorded, captured or contained in the medium.

In any representation of the design, the data may be stored in any form of a machine readable medium. An optical or electrical wave 660 modulated or otherwise generated to transport such information, a memory 650 or a magnetic or optical storage 640, such as a disk, may be the machine readable medium. Any of these mediums may carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

It will be appreciated that, for other embodiments, a different system configuration may be used. For example, while the systems show include a single CPU, for other embodiments, a chipset multiprocessor (CMP) system including a plurality of processor cores or a multiprocessor system (where one or more processors may be similar in configuration and operation to the CPU 554/572 described above) may benefit from the two micro-operation flow using source override of various embodiments. Further different type of system or different type of computer system such as, for example, a server, a workstation, a desktop computer system, a gaming system, an embedded computer system, a blade server, etc., may be used for other embodiments.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived therefrom, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed embodiments and the best mode, modifications and variations may be made to the disclosed embodiments while remaining within the scope of the embodiments as defined by the following claims.

What is claimed is:

1. A method for operating a multi-phase switching regulator, comprising:
   generating a dynamic switching frequency waveform according to a sinusoidal reference value, the dynamic switching frequency waveform comprising a plurality of pulses with a varying time separation between corresponding edges of consecutive pulses; and
   firing at least two, time-shifted pulse width modulated waveforms to corresponding drivers of the regulator in response to the dynamic switching frequency waveform to continually adjust the switching frequency between at least two phases of the regulator to prohibit synchronization between an integrated circuit (IC) load frequency and the regulator phase switching frequency.

2. The method of claim 1, wherein the generating a switching frequency waveform comprises:
   repeatedly driving a current to generate a voltage ramp;
   determining a rate at which the voltage ramp intersects a sinusoidal reference voltage; and
   generating the wave-modulated clock pulse according to the determined rate at which the voltage ramp intersects the sinusoidal reference voltage.

3. The method of claim 1, wherein the firing at least two, time-shifted phases of the regulator comprise:
   generating a wave-modulated clock waveform according to a determined rate at which a voltage ramp intersects a sinusoidal reference voltage, the wave-modulated clock waveform comprising a plurality of pulses with a varying time separation between corresponding edges of consecutive pulses;
   generating a duty cycle waveform having a triangular pulse for each pulse of the clock waveform, wherein each triangular pulse comprises a ramp rising edge, a ramp falling edge and a center according to a corresponding pulse of the wave-modulated clock waveform;

generating the a first dual edge modulated waveform, according to the duty cycle waveform, as a first pulse width modulated waveform; and phase shifting the first dual edge modulated waveform to form a second, time-shifted pulse width modulated waveform.

4. The method of claim 1, wherein the firing at least two, time-shifted phases of the regulator comprise:

supplying a first pulse width modulated waveform to a first driver in response to the dynamic switching frequency waveform;

pulsing a first high side transistor and a first low side transistor to drive a first phase according to the first pulse width modulated waveform;

supplying a second pulse width modulated waveform to a second driver in response to the dynamic switching frequency waveform; and pulsing a second high side transistor and a second low side transistor to drive a second phase according to the second pulse width modulated waveform, wherein the high side and low side transistors for each phase are driven in a manner inverse to each other.

5. An integrated circuit device, comprising:

a controller to control, at least in part, voltage regulation circuitry having at least two phases, wherein the controller is to regulate a switching frequency of the voltage regulation circuitry during firing of at least two, time-shifted pulse width modulated waveforms to corresponding drivers of the voltage regulation circuitry, the controller circuitry to fire the time-shifted pulse width modulated waveforms in response to a dynamic switching frequency waveform formed with a sinusoidal reference signal to continually adjust the switching frequency between the at least two phases of the voltage regulation circuitry to prohibit synchronization between the frequency of the load drawn by the integrated circuit device and the voltage regulation circuitry phase switching frequency.

6. The integrated circuit of claim 5, further comprising:

a clock generation circuit to repeatedly drive a current to generate a voltage ramp, to determine a rate at which the voltage ramp intersects the sinusoidal reference signal and to generate a wave-modulated clock pulse as the switching frequency waveform according to the determined rate at which the voltage ramp intersects the sinusoidal reference signal, the dynamic switching frequency waveform comprising a plurality of pulses with varying time between corresponding edges of consecutive pulses; and a pulse width modulation circuit to generate the at least two, time-shifted pulse width modulated waveforms and to drive the at least two, time-shifted pulse width modulated waveforms to the corresponding drivers in response to the dynamic switching frequency waveform.

7. The integrated circuit of claim 5, wherein the voltage regulation circuitry further comprises:

a first driver to receive a first pulse width modulated waveform in response to the dynamic switching frequency waveform;

a first high side transistor and a first low side transistor, the first driver to drive a first phase in response to the first pulse width modulated waveform;

a second driver to receive a second pulse width modulated waveform in response to the dynamic switching frequency waveform; and a second high side transistor and a second low side transistor, the second driver to drive a second phase according to the second pulse width modulated waveform, wherein the regulator is to drive the high side and low side transistors for each phase in a manner inverse to each other.

8. A computer system comprising:

a step-down dc-dc switching voltage regulator having at least two phases;

an integrated circuit coupled with the step-down dc-dc switching voltage regulator;

a controller for the switching regulator integrated within the integrated circuit, the controller to regulate a switching frequency of the voltage regulator during a firing of at least two, time-shifted pulse width modulated waveforms to corresponding drivers of the voltage regulator in response to a dynamic switching frequency waveform formed with a sinusoidal reference signal to continually adjust the switching frequency between the at least two phases of the voltage regulator to prohibit synchronization between a frequency of a load drawn by the integrated circuit and the regulator phase switching frequency; and a wireless transmitter and receiver coupled to the integrated circuit.

9. The system of claim 8, further comprising a module board on which the regulator is directly installed.

10. The system of claim 8, further comprising a motherboard on which the integrated circuit and the voltage regulator are directly installed.

11. The system of claim 8, wherein the regulator comprises:

a first driver to receive a first pulse width modulated waveform in response to the dynamic switching frequency waveform;

a first high side transistor and a first low side transistor, the first driver to drive a first phase in response to the first pulse width modulated waveform;

a second driver to receive a second pulse width modulated waveform in response to the dynamic switching frequency waveform; and a second high side transistor and a second low side transistor, the second driver to drive a second phase according to the second pulse width modulated waveform, wherein the regulator is to drive the high side and low side transistors for each phase in a manner inverse to each other.

12. The system of claim 11, further comprising a module board on which the regulator is directly installed.

13. The system of claim 11, further comprising a motherboard on which the integrated circuit and the regulator are directly installed.

14. The system of claim 8, wherein the regulator further comprising:

a clock generation circuit to repeatedly drive a current to generate a voltage ramp, to determine a rate at which the voltage ramp intersects a sinusoidal reference voltage and to generate a wave-modulated clock pulse as the switching frequency waveform according to the determined rate at which the voltage ramp intersects the sinusoidal reference voltage, the dynamic switching frequency waveform comprising a plurality of pulses with varying time between consecutive pulses; and a pulse width modulation circuit to generate the at least two, time-shifted pulse width modulated waveforms and to drive the at least two, time-shifted pulse width modulated waveforms to the corresponding drivers in response to the dynamic switching frequency waveform.

15. The system of claim 14, further comprising a motherboard on which the regulator is directly installed.

16. The system of claim 14, wherein the controller is integrated on-chip with the integrated circuit.

17. The system of claim 16, wherein the integrated circuit comprises a plurality of processor cores each of which is coupled to be powered by a same output node of the switching regulator.

18. An integrated circuit, comprising:
a controller for a switching voltage regulator having at least two or more phases, the controller to regulate a switching frequency of the voltage regulator (VR) during a firing of at least two, time-shifted pulse width modulated waveforms corresponding drivers of the voltage regulator in response to a dynamic switching frequency waveform formed with a sinusoidal reference signal to continually adjust the switching frequency between the at least two phases of the VR to prohibit synchronization between the frequency of a load drawn by the integrated circuit and the VR phase switching frequency.

19. The integrated circuit of claim 18, wherein the voltage regulator further comprising:
a clock generation circuit to repeatedly drive a current to generate a voltage ramp, to determine a rate at which the voltage ramp intersects the sinusoidal reference signal and to generate a wave-modulated clock pulse as the dynamic switching frequency waveform according to the determined rate at which the voltage ramp intersects the sinusoidal reference, the dynamic switching frequency waveform comprising a plurality of pulses with varying time between corresponding edges of consecutive pulses.

20. The integrated circuit of claim 18, wherein the voltage regulator further comprises:
a pulse width modulation circuit to generate the at least two, time-shifted pulse width modulated waveforms, the pulse width modulation waveforms comprising a plurality of pulses with a modulated pulse width.

* * * * *